No. 691,188. Patented Jan. 14, 1902.
A. W. SCHRAMM.
MEANS FOR REGULATING ELECTRIC MOTORS.
(Application filed Oct. 30, 1899.)
(No Model.)
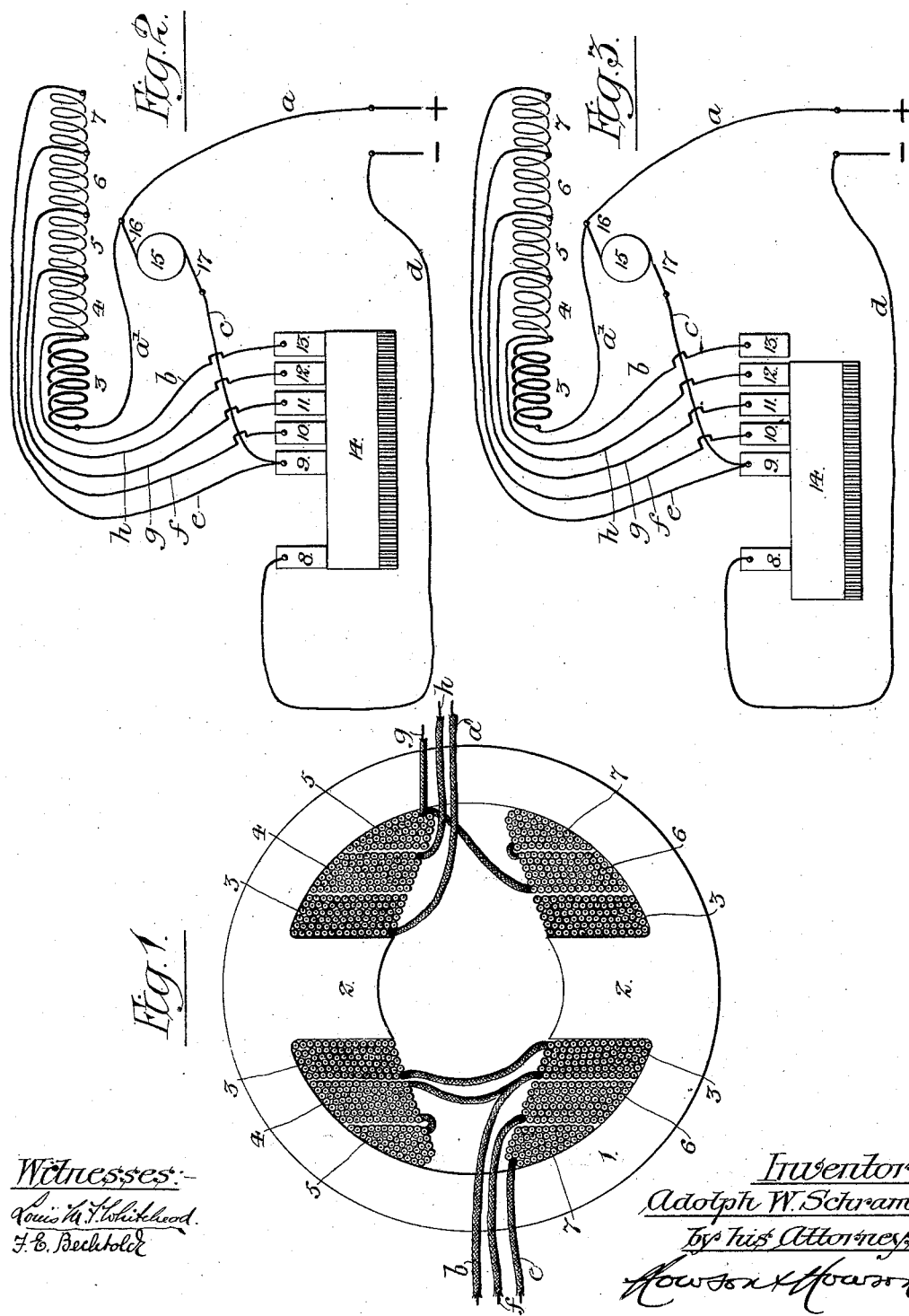
Witnesses:-
Louis M. F. Whitehead.
F. E. Bechtold.
Inventor:-
Adolph W. Schramm.
by his Attorneys:-
Howson & Howson

UNITED STATES PATENT OFFICE.

ADOLPH W. SCHRAMM, OF PHILADELPHIA, PENNSYLVANIA, ASSIGNOR TO THE ELECTRO DENTAL MANUFACTURING COMPANY, OF CAMDEN, NEW JERSEY, A CORPORATION OF NEW JERSEY.

MEANS FOR REGULATING ELECTRIC MOTORS.

SPECIFICATION forming part of Letters Patent No. 691,188, dated January 14, 1902.

Application filed October 30, 1899. Serial No. 735,230. (No model.)

*To all whom it may concern:*

Be it known that I, ADOLPH W. SCHRAMM, a citizen of the United States, residing in Philadelphia, Pennsylvania, have invented certain Improvements in Means for Regulating Electric Motors, of which the following is a specification.

The object of my invention is to provide simple and efficient means for varying the speed of an electric motor; and this object I attain by employing in series with the shunt-field of the motor a number of reverse windings or resistances which may be successively short-circuited or put in circuit.

In the accompanying drawings, Figure 1 is a sectional view of a field-magnet with winding intended for carrying out my invention, and Figs. 2 and 3 are diagrams illustrating said winding and a certain switch-plate and contact-bars used in connection therewith.

In Fig. 1 the field-magnet of an electric motor is represented at 1 and the pole-pieces of the same at 2, these pole-pieces having the main winding 3 and a series of supplementary windings in series therewith, four of these windings being shown in the present instance and numbered 4, 5, 6, and 7, respectively. These supplementary windings are so connected to the source of current-supply that the current will traverse the same in a direction the reverse of that in which it traverses the main winding 3, each winding being so connected to a suitable switch that the current may be caused to pass through the main winding 3 alone or may be caused to pass through one or more of the supplementary windings in addition to the main winding. One form of switch available for the purpose is that shown in Figs. 2 and 3 and consists of a number of contact-plates 8, 9, 10, 11, 12, and 13, which operate in conjunction with a sliding switch-plate 14, the latter being traversed across the series of contact-plates by means of a rack and pinion or other suitable device.

In Figs. 2 and 3 the field-windings are conventionally represented by the coils 3, 4, 5, 6, and 7, while 15 represents the armature, 16 and 17 the brushes of the same, and the + and − signs, respectively, the positive and negative terminals of a battery or other suitable generator of electricity. One of the terminals of this generator—say the positive terminal—is connected by a wire $a$ to the brush 16 of the armature and by a wire $a'$ to one of the terminals of the winding 3 of the field, the latter being a shunt-wound field and the other terminal of the coil 3 being connected by a wire $b$ to the contact-plate 13. The brush 17 of the armature is connected by a wire $c$ to the contact-plate 9, and the negative terminal of the generator is connected by a wire $d$ to the contact-plate 8. The contact-plates 9, 10, 11, and 12 are connected, respectively, by wires $e$, $f$, $g$, and $h$ to the terminals of the reverse windings 7, 6, 5, and 4, these windings being connected in series and the winding 4 being connected to the main winding 3 of the field. When the switch is in the position shown in Fig. 2, current passes from the positive terminal $x$ through the armature by $a$, 16, 15, 17, $c$, 9, 14, 8, and $d$ to the negative terminal and through the main winding 3 of the field by $a$, $a'$, 3, $b$, 13, 14, 8, and $d$, all of the reverse windings being short-circuited by the plate 14. When, however, the switch is moved to the position shown in Fig. 3, the contact-plate 13 is cut out of circuit, and the current to and through the field is by $a$, $a'$, 3, 4, $h$, 12, 14, 8, and $d$—that is to say, a portion of the current passes through the first of the reverse winds 4 and sets up therein a magneto-motive force counter to that of the main winding, thereby neutralizing a portion of the magneto-motive force of the latter and correspondingly diminishing the magneto-motive force exerted by the field upon the armature, and by further movement of the switch 14 successive sections of the reverse winding may be put in circuit and the magneto-motive force of the field still further reduced. The reversely-wound coils 4, 5, 6, and 7 act also as resistances and in some cases may act only in this way, in which case of course they need not form part of the field-winding of the motor, but may be otherwise disposed. When the energizing-current is cut off by moving the plate 14 out of contact with the plate 8, there still remains a closed circuit including the armature and the winding 4 of the field, thus 15, 16, *a*, 3, *b*, 13, 14, 9, *c*, and 17. Hence the armature rotating by momentum generates current which excites the field, thus causing the device to act as a dynamo and quickly bringing the armature to a stop.

Having thus described my invention, I claim and desire to secure by Letters Patent—

1. An electric motor having a shunt-field with a number of reverse windings in series therewith and an armature with one brush connected to one terminal of the shunt-field and the other to the other terminal of said reverse windings, in combination with a switch having contacts connected to said windings, and a movable plate constructed to short-circuit two or more of said contacts, substantially as described.

2. An electric motor having a shunt-field with a number of reverse windings in series therewith and an armature with one brush connected to one terminal of the shunt-field and the other brush connected to the other terminal of said reverse windings, in combination with a switch having contacts connected to said windings, and a movable plate constructed to short-circuit said contacts when the switch is closed, with means for moving said plate off said contacts successively when it is desired to speed up the motor, substantially as described.

In testimony whereof I have signed my name to this specification in the presence of two subscribing witnesses.

ADOLPH W. SCHRAMM.

Witnesses:
JOS. H. KLEIN,
F. E. BECHTOLD.